United States Patent [19]

Krinsky et al.

[11] Patent Number: 4,859,015
[45] Date of Patent: Aug. 22, 1989

[54] OPTICAL RECEIVER HAVING OPTICAL GAIN MEDIUM AND MODE SELECTOR

[75] Inventors: Jeffrey A. Krinsky; Robert A. Falk, both of Renton, Wash.

[73] Assignee: The Boeing Company, Seattle, Wash.

[21] Appl. No.: 233,334

[22] Filed: Aug. 17, 1988

[51] Int. Cl.$^4$ .................. G02B 6/26; H01S 3/098; G02F 1/00; H01L 27/14

[52] U.S. Cl. .................. 350/96.15; 350/96.10; 350/96.16; 372/19; 372/43; 250/227; 455/612; 455/617; 455/619; 357/19; 357/30

[58] Field of Search .............. 350/96.10, 96.11, 96.15, 350/96.16, 96.17, 96.20, 96.23, 96.29, 96.30; 455/610, 612, 617, 619; 250/227; 357/17, 19, 30; 372/6, 18, 19, 43

[56] References Cited

U.S. PATENT DOCUMENTS

| | | | |
|---|---|---|---|
| Re. 28,753 | 3/1976 | Zavodny | 372/54 X |
| 3,395,366 | 7/1968 | Snitzer et al. | 372/19 X |
| 3,532,889 | 10/1970 | Kompfner | 455/600 X |
| 3,571,737 | 3/1971 | Miller | 350/96.29 X |
| 3,599,106 | 8/1971 | Snitzer | 372/6 X |
| 3,724,926 | 4/1973 | Lee | 357/19 X |
| 3,761,716 | 9/1973 | Kapron et al. | 350/96.30 X |
| 3,777,280 | 12/1973 | Pohl | 372/19 X |
| 3,803,511 | 4/1974 | Thompson | 350/96.15 |
| 4,015,217 | 3/1977 | Snitzer | 372/6 X |
| 4,076,375 | 2/1978 | Muska et al. | 350/96.15 |
| 4,146,298 | 3/1979 | Szczepanek | 350/96.15 |
| 4,229,067 | 10/1980 | Love | 350/96.15 |
| 4,381,137 | 4/1983 | Berg et al. | 350/96.15 X |
| 4,558,921 | 12/1985 | Hasegawa et al. | 350/96.29 |
| 4,583,226 | 4/1986 | Liou | 372/19 |
| 4,641,914 | 2/1987 | Sheem | 350/96.15 |
| 4,644,556 | 2/1987 | Petuchowski et al. | 372/6 X |
| 4,645,915 | 2/1987 | Van Ruyven | 372/6 X |
| 4,680,767 | 7/1987 | Hakimi et al. | 372/6 |
| 4,682,335 | 7/1987 | Hughes | 372/6 |
| 4,689,797 | 8/1987 | Olshansky | 372/19 X |
| 4,723,828 | 2/1988 | Garel-Jones et al. | 350/96.15 |
| 4,741,586 | 5/1988 | Kim et al. | 350/96.15 |
| 4,768,849 | 9/1988 | Hicks, Jr. | 350/96.15 |
| 4,768,851 | 9/1988 | Shaw et al. | 350/96.15 |
| 4,778,237 | 10/1988 | Sorin et al. | 350/96.15 |

OTHER PUBLICATIONS

"Laser Amplifier Repeater" Passes Test In 75-Mile Fiber Link *Electronic Engineering Times*, Apr. 27, 1987.

Primary Examiner—William L. Sikes
Assistant Examiner—Brian M. Healy
Attorney, Agent, or Firm—Christensen, O'Connor, Johnson & Kindness

[57] ABSTRACT

An optical receiver particularly suited for use in a noisy environment, the receiver includes an optical gain device for amplifying an input signal to produce an amplified input signal, a photodetector, and a mode selector. The optical gain device includes an optical gain medium, an optical input port through which the input signal may be received into the optical gain medium, and an optical output port through which an optical output signal may leave the optical gain medium. The output signal includes the amplified input signal, plus any noise generated within the optical gain device. The input and output ports include antireflection means. In a preferred embodiment, the mode selector comprises a single mode fiber-optic cable that transmits a single spatial mode of the output signal to the photodetector.

5 Claims, 1 Drawing Sheet

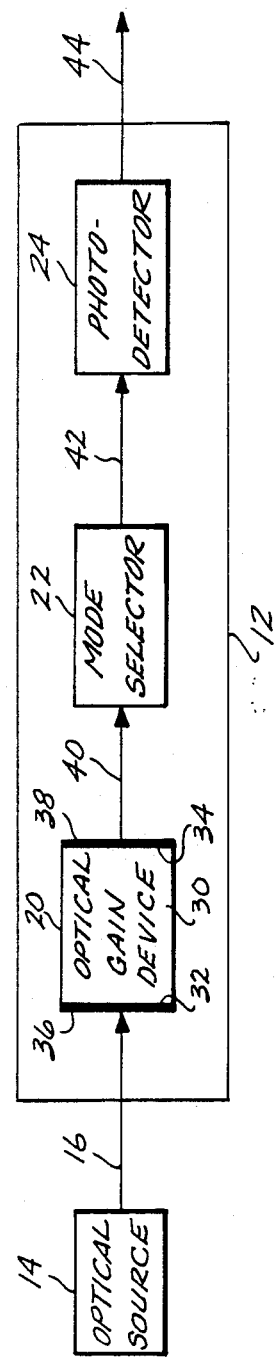

OPTICAL RECEIVER HAVING OPTICAL GAIN MEDIUM AND MODE SELECTOR

FIELD OF THE INVENTION

The present invention relates to optical signaling and, in particular, to an optical receiver for receiving and detecting an optical input signal.

BACKGROUND OF THE INVENTION

Recent advances in fiber-optic technology have improved the data-carrying capacity of optical fibers. These advances have included wavelength division multiplexing and the use of simultaneous bidirectional data transmission. These techniques have significantly reduced the cost, size and weight of optical communication systems. However, one limitation of present optical communication systems is that they are generally not radiation hardened to a significant degree, and thus will not function effectively in the presence of ionizing radiation or electromagnetic interference (EMI).

SUMMARY OF THE INVENTION

The present invention provides an optical receiver that may be used in a fiber-optic communication system to decrease the vulnerability of the system to ionizing radiation and electromagnetic interference.

In a preferred embodiment, the receiver comprises an optical gain device for amplifying an input signal to produce an amplified input signal, a photodetector, and a mode selector. The optical gain device comprises an optical gain medium, an optical input port through which the input signal may be received into the optical gain medium, and an optical output port through which an optical output signal may leave the optical gain medium. The output signal includes the amplified input signal, plus any noise generated within the optical gain device. The optical gain device further comprises antireflection means associated with the input and output ports, to minimize reflections at the ports. The mode selector is connected to receive the output signal from the optical gain device, and preferentially transmits one or more preselected spatial modes of the output signal to the photodetector. The photodetector produces a corresponding electrical signal. In a preferred arrangement, the input signal is provided to the optical gain device through a first single mode fiber-optic cable, and the mode selector comprises a second single mode fiber-optic cable that supports the same mode as that of the first fiber-optic cable.

BRIEF DESCRIPTION OF THE DRAWING

The single FIGURE is a block diagram of an optical receiver according to the present invention.

DETAILED DESCRIPTION OF THE INVENTION

FIG. 1 sets forth a schematic diagram of a preferred embodiment of the optical receiver of the present invention. The receiver 12 is connected to receive an optical input signal launched by optical source 14 onto single mode fiber-optic cable 16. "Single mode" refers to the fact that the fiber-optic cable is constructed so as to transmit only a single spatial mode at the wavelength produced by the optical source. While the present invention will be described in terms of single mode fiber-optic cables, it is to be understood that other optical transmission means, such as multimode fiber-optic cables having low numerical apertures, could also be used.

Receiver 12 comprises optical gain device 20, mode selector 22, and photodetector 24. Optical gain device 20 includes optical gain medium 30, input port 32 and output port 34. The input and output ports are provided with antireflection coatings 36 and 38, respectively.

In a preferred embodiment, optical gain device 20 may be constructed in a manner similar to a laser diode. However, unlike a laser diode, the ends of the optical gain medium are provided with antireflection coatings. The optical input signal entering the optical gain medium through input port 32 will be amplified as it traverses the optical gain medium, and the amplified input signal will pass through output port 34 onto output fiber-optic cable 40. Thus unlike a laser in which light undergoes multiple reflections and makes multiple passes through the optical gain medium, optical gain device 20 is constructed so as to minimize the number of passes of the light through the gain medium. In a preferred and idealized limit, all of the light in an input signal pulse entering via input port 32, and all light generated within the optical gain device in response to the input pulse, will exit through output port 34 without reflection. Multiple passes through the gain medium are undesirable, since they result in the spreading of pulses, and the production of time-delayed copies of pulses.

The amplified input signal on fiber-optic cable 40 is input to mode selector 22, and the mode selector passes one or more preselected spatial modes of the optical signal, while attenuating other spatial modes. The spatial modes passed by mode selector 22 are preferably the same as the spatial modes transmitted by fiber-optic cable 16. In a preferred embodiment, the mode selector comprises a single mode fiber-optic cable that transmits only one spatial mode. However, low numerical aperture (NA) fiber-optic cables, spatial filters, optical waveguides, and other mode selectors may also be used. The optical signal that passes through the mode selector travels via fiber-optic cable 42 to photodetector 24, where it is converted into a corresponding electrical signal on line 44. When the mode selector comprises a fiber-optic cable, fiber-optic cables 40 and 42 will generally not be needed.

The overall function of the illustrated receiver is to amplify and then detect the input signal on fiber-optic cable 16, without introducing excessive noise into the process. While use of an optical gain device in combination with a photodetector, without a mode selector, is suitable for some applications, such a combination will not function well in an ionizing radiation or EMI environment, since the ionizing radiation or EMI will introduce excessive noise into the optical gain device. Optical gain devices can, in fact, be observed to glow in the presence of ionizing radiation, in the absence of an input signal.

For an ionizing radiation or EMI environment, the advantage of using the mode selector can be seen by considering the different sources of the light that pass through output port 34 onto fiber-optic cable 40. These sources include (1) an amplified version of the input signal that was transmitted through fiber-optic cable 16; (2) noise induced in the gain medium (e.g., noise produced by ionizing radiation); and (3) noise caused by spontaneous emission in the optical gain medium. Only the amplified information signal will have the proper spatial mode to be passed by mode selector 22. Considered from another point of view, radiation generated by ionizing radiation or other noise sources in optical gain medium 30 will be produced in random directions, and thus will be substantially uniformly distributed over a full $4\pi$ steradians. Therefore, only a small fraction of the noise will be emitted in the proper direction so that it passes through output port 34 and avoids attenuation by the mode selector. Even if the ionizing radiation originated from a burst and thus had a preferred direction, the probability that it would have the spatial angle required by the mode selector would be very low. Furthermore, the preferential gain of the input signal will ensure that the photocurrents generated by the amplified mode selected input signal in the detector are much larger than photocurrents generated due to any ionizing radiation or other noise source that may be present. The result is that as compared to a conventional optical receiver, the output of the photodetector due to the amplified input signal will be much larger relative to the output due to noise, resulting in a larger signal-to-noise ratio than if the gain medium had not been used.

Optical gain device 20 preferably comprises a semiconductor gain medium, similar to that of a laser diode, together with means for pumping the gain medium to produce a population inversion. A suitable pumping means is simply a DC voltage. The coupling between single mode fiber-optic cables 16 and 40 and optical gain device 20 may comprise any one of a number of well-known coupling devices, such as quarter pitch GRIN lenses. Mode selector 22 preferably comprises a single mode fiber-optic cable, as described above, but could comprise other known mode selection devices, such as pinhole spatial filters. If a single mode fiber is selected for mode selector 22, the fiber should be constructed such that it is single mode for the shortest wavelength that will be used in the receiver. Antireflection coatings 36 and 38 could be replaced by other antireflection means, such as Brewster angle windows, and both antireflection coatings and Brewster angle windows could be used in a single device. Photodetector 24 may comprise a PIN diode, or any other suitable photosensitive device. Preferably, photodetector 24 and the other electrical components used in connection with the photodetector comprise radiation-hardened electronics.

While preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A receiver for receiving and detecting an optical input signal, the receiver comprising:
    an optical gain device for amplifying the input signal to produce an amplified input signal, the optical gain device comprising an optical gain medium, an optical input port through which the input signal may be received into the optical gain medium, and an optical output port through which an optical output signal may leave the optical gain medium, the output signal including the amplified input signal and any noise generated within the optical gain device, the optical gain device further comprising antireflection means associated with the input and output ports to minimize reflections at such ports;
    a photodetector for receiving an optical signal and producing a corresponding electrical signal; and
    a mode selector connected to receive the output signal from the optical gain device, the mode selector including means for preferentially transmitting one or more preselected spatial modes of the output signal to the photodetector.

2. The receiver of claim 1, wherein the mode selector comprises a single mode fiber-optic cable.

3. The receiver of claim 1, wherein the input signal is provided to the optical gain device through a first single mode fiber-optic cable, wherein the mode selector comprises a second single mode fiber-optic cable, the modes preferentially transmitted by the first and second fiber-optic cables being identical to one another.

4. The receiver of claim 1, wherein the optical gain device comprises a semiconductor gain medium.

5. The receiver of claim 4, wherein the antireflection means comprises antireflection coatings at the input and output ports.

* * * * *